(12) United States Patent
Llorach To et al.

(10) Patent No.: US 12,343,669 B2
(45) Date of Patent: Jul. 1, 2025

(54) AEROSOL REMOVAL

(71) Applicant: Hewlett-Packard Development Company, L.P., Spring, TX (US)

(72) Inventors: Marcel Llorach To, Sant Cugat del Valles (ES); Jordi Albert Gine, Sant Cugat del Valles (ES); Kurt Vandenbergh, Sant Cugat del Valles (ES)

(73) Assignees: IDNEO TECHNOLOGIES, S.A.U., Barcelona (ES); HEWLETT-PACKARD DEVELOPMENT COMPANY, L.P., Spring, TX (US)

( * ) Notice: Subject to any disclaimer, the term of this patent is extended or adjusted under 35 U.S.C. 154(b) by 456 days.

(21) Appl. No.: 17/772,227

(22) PCT Filed: Nov. 19, 2019

(86) PCT No.: PCT/US2019/062204
§ 371 (c)(1),
(2) Date: Apr. 27, 2022

(87) PCT Pub. No.: WO2021/101526
PCT Pub. Date: May 27, 2021

(65) Prior Publication Data
US 2022/0370940 A1 Nov. 24, 2022

(51) Int. Cl.
*B01D 46/00* (2022.01)
*B01D 46/10* (2006.01)
(Continued)

(52) U.S. Cl.
CPC ..... *B01D 46/0043* (2013.01); *B01D 46/0031* (2013.01); *B01D 46/10* (2013.01);
(Continued)

(58) Field of Classification Search
CPC ............ B01D 46/0043; B01D 46/0031; B01D 46/10; B01D 2273/28; B01D 2279/00;
(Continued)

(56) References Cited

U.S. PATENT DOCUMENTS 3,566,585 A * 3/1971 Voloshen ............ F24C 15/2035
55/435
6,318,838 B1 11/2001 Anderson et al.
(Continued)

FOREIGN PATENT DOCUMENTS

| CN | 205461401 U | 8/2016 |
| EP | 1652675 A1 | 5/2006 |
| JP | 08-238784 A | 9/1996 |

*Primary Examiner* — Frank M Lawrence, Jr.
(74) *Attorney, Agent, or Firm* — Jordan IP Law, LLC

(57) ABSTRACT

The present disclosure relates to methods and devices for removing an aerosol generated during a printing process. In an example there is disclosed a device which may comprise an air suction device, an air flow baffle, an aerosol absorber, and a droplet filter. The air suction device may draw air away from an area around a printhead nozzle, past the air flow baffle, through the droplet filter, towards the air suction device. The air flow baffle may cause a change in air flow direction such that at least some aerosol droplets contact the aerosol absorber.

13 Claims, 6 Drawing Sheets

Figure 3A:
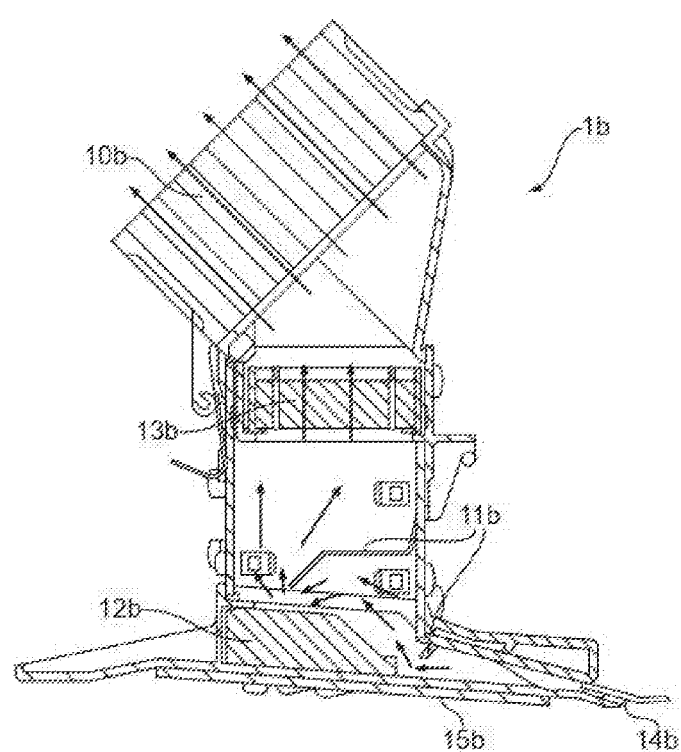

(51) Int. Cl.
*B41J 2/165* (2006.01)
*B41J 29/17* (2006.01)

(52) U.S. Cl.
CPC ....... *B41J 2/16517* (2013.01); *B01D 2273/28* (2013.01); *B01D 2279/00* (2013.01)

(58) Field of Classification Search
CPC ................ B01D 46/12; B01D 2273/30; B01D 46/0038; B01D 46/0041; B41J 2/16517; B41J 29/377; B41J 29/17
USPC ......... 55/315, 318, 320, 392, 434, 435, 437; 95/273, 284
See application file for complete search history.

(56) References Cited

U.S. PATENT DOCUMENTS

| | | |
|---|---|---|
| 6,565,189 B2 | 5/2003 | Yamada et al. |
| 6,629,750 B2 | 10/2003 | Ciordia |
| 6,746,099 B2 | 6/2004 | Smith et al. |
| 8,177,887 B2 | 5/2012 | Schmid et al. |
| 8,449,073 B2 | 5/2013 | Rosati et al. |
| 9,315,037 B2* | 4/2016 | Gasso Puchal ........ B41J 2/1714 |
| 2003/0016276 A1* | 1/2003 | Jeanmaire .................. B41J 2/03 347/77 |
| 2004/0085389 A1* | 5/2004 | Smith .................... B41J 2/1714 347/34 |
| 2008/0143781 A1* | 6/2008 | Inoue .................... B41J 2/1714 347/34 |

* cited by examiner

Fig. 1

Fig. 2

Drawing air away from
printhead nozzle towards an
airflow turbulence inducer
S101

Fig. 5

Positioning obstacle and filter
S201

Drawing air away from
printhead nozzle
S202

Fig. 6

AEROSOL REMOVAL

BACKGROUND

Inkjet printing systems form printed images by ejecting print fluids onto a print target such as various print media. Examples of such printing systems include drop-on-demand, multi-pass scanning type systems, single-pass page-wide systems, and three-dimensional (3D) printing systems that print fluids onto layers of build material.

An inkjet printing system may include a printhead, an ink supply which supplies ink to the printhead, and an electronic controller which controls the printhead. The printhead may eject drops of ink through a plurality of nozzles or orifices and toward a print medium, such as a sheet of paper, so as to print onto the print medium. The orifices may be arranged in at least one column or array such that properly sequenced ejection of ink from the orifice causes characters or other images to be printed upon the print medium as the printhead and the print medium are moved relative to each other

BRIEF DESCRIPTION OF DRAWINGS

Non-limiting examples will now be described with reference to the accompanying drawings, in which:

FIG. 1 is a simplified schematic of a device according to some examples;

FIG. 2 is another simplified schematic of a device according to some examples;

FIGS. 3*a* and 3*b* are schematics of a device according to some examples;

FIG. 4 is a schematic is a device having a removable aerosol absorber according to some examples;

FIG. 5 is a flowchart of a method according to some examples; and

FIG. 6 is another flowchart of a method according to some examples.

DETAILED DESCRIPTION

Inkjet printing systems such as drop-on-demand, multi-pass scanning type systems and single-pass page-wide systems that implement drop formation mechanisms such as thermal element actuators (i.e., firing resistors) and piezo-electric material actuators, may be susceptible to adverse conditions that may degrade printer functionality and print quality. For example, such systems may implement printheads comprising very small ejection nozzles that eject or fire small drops of liquid ink onto media substrates, which may generate aerosols. Aerosols generally comprise a mixture of fine liquid drops, and in the context of inkjet printing systems an aerosol may include very small liquid ink drops comprising dissolved colorants or pigments dispersed in a solvent.

During ink drop ejections, aerosol drops, for example smaller drops, may not have enough momentum to travel far enough and/or straight enough to strike the media substrate at an intended location to generate printed output. As a result, aerosol drops may cause unwanted stains to develop on a printed output, make printer components dirty, and/or degrade printer functionality, for example, by creating a coating over printer components, such as sensors.

During extended periods of printing where many ink ejections are occurring from printhead nozzles, large quantities of aerosol can be generated. Aerosol generation can also occur during other system functions such as printhead start-up, printhead servicing, drop detection, printing alignments, and so on. In some examples, printhead servicing can include "spitting", which is the ejection of ink drops into a service station spittoon. During such printhead servicing, the effects of aerosol can be more pronounced. In general, aerosol can degrade the performance of surrounding printer components, and can affect the overall life and performance of an inkjet printing system.

Therefore, in some examples, aerosols generated in the manner described above may be reduced, leading to improved print quality and printer life.

In some examples, described herein and as shown in FIG. 1, there is provided a device 1. The device 1 may comprise an air suction device 10, an air flow baffle 11, an aerosol absorber 12 and a droplet filter 13. The air suction device 10 may draw air away from an area around a printhead nozzle, past the air flow baffle 11, through the droplet filter 13, towards the air suction device 10. The air flow baffle 11 may cause a change in air flow direction such that at least some aerosol droplets contact the aerosol absorber 12.

According to some examples, the air suction device 10 may draw air towards itself. The air may be an aerosol in that there may be droplets/particles of print material suspended therein. The air may flow from the printhead nozzle and, in particular, from an area through which print material travels when deposited from the printhead nozzle onto a print medium, during a printing process. The air may further flow towards an air flow baffle 11, such that the air is diverted by the baffle 11 to change direction. Air that is diverted by the baffle 11 may change direction abruptly, in which case some aerosol droplets may be forced towards the aerosol absorber 12, which, on contact, absorbs and collects the droplets. Air, having fewer aerosol droplets suspended therein, may then flow towards and through the droplet filter 13, which may be a filter fine enough to remove the remaining droplets. The air may then flow towards and/or through the air suction device 10, at which point the air may have none or a negligible amount of aerosol droplets left suspended therein.

The device 1 may be an aerosol remover or may be part of a printhead cleaning system. The air suction device 10 may draw air away from the printhead nozzle and, in particular, from the area between the printhead nozzle and the print media. Removal of the aerosol from the path of the print material, for example ink, may reduce distortions in the flight path of the ink, leading to more accurate printing and improved image quality.

Providing the air flow baffle 11 and aerosol absorber 12 before the droplet filter 13, along the flow path, may provide the benefit of removing some aerosol droplets and, in particular larger aerosol droplets, before the air flow reaches the droplet filter 13. The droplet filter 13 may be a more expensive component than the aerosol absorber 12. Thus, removing some droplets from the air before the air flow reaches the droplet filter 13 may increase the useful life of the droplet filter 13 and reduce running costs associated with maintenance of the printer and the device 1.

In some examples, the air suction device 10 may be a fan, air moving device or any other device suitable for providing a reduced air pressure or partial vacuum to draw air and/or aerosol away from an area around a printhead nozzle. The air flow baffle 11 may be a wall or surface or any obstacle which, when placed in the path of the air flow, causes the direction of the air flow to change. The change in air flow direction may cause at least one aerosol droplet (aerosol particle or print material droplet) to contact the aerosol absorber 12. The aerosol absorber 12 may in some examples be integral with the air flow baffle 11. In other examples, the aerosol absorber 12 may be positioned in the redirected air flow path, once the air has passed the air flow baffle 11. In some examples, references herein to air may refer to aerosol, i.e. air with particles or droplet suspended therein.

The aerosol absorber 12 may be a foam, sponge or other material suitable for absorbing print material, for example ink. The droplet filter 13 may be any suitable filter for filtering ink droplets from the air. The droplet filter 13 may be positioned ahead of the air suction device 10 (in the direction/path of air flow) so that fewer or no ink droplets reach the air suction device 10. This may extend the life of the air suction device 10.

Figure 1:
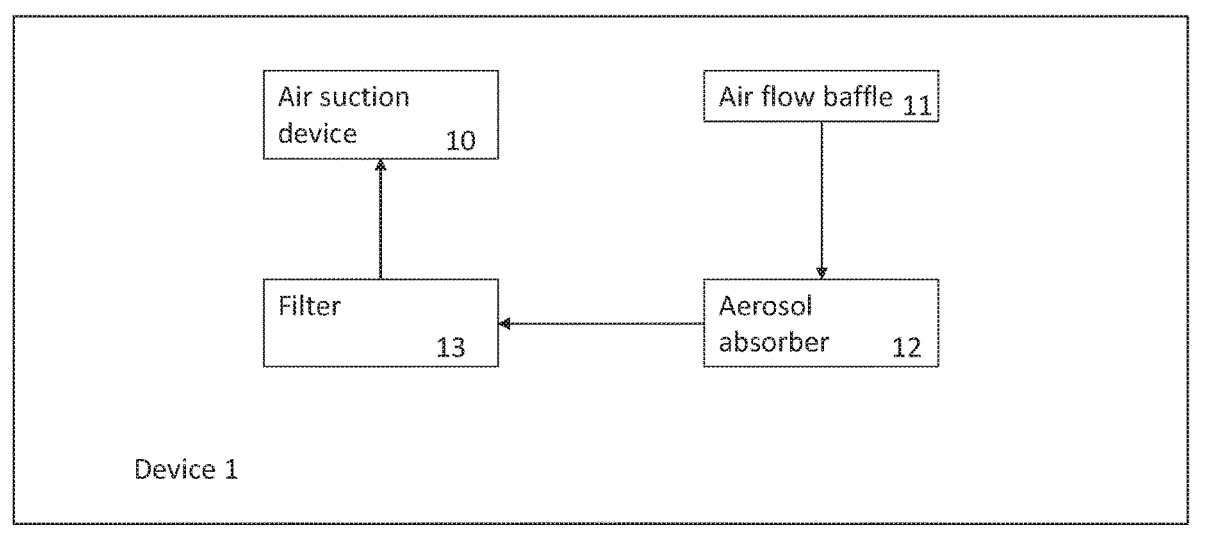
Figure 2:
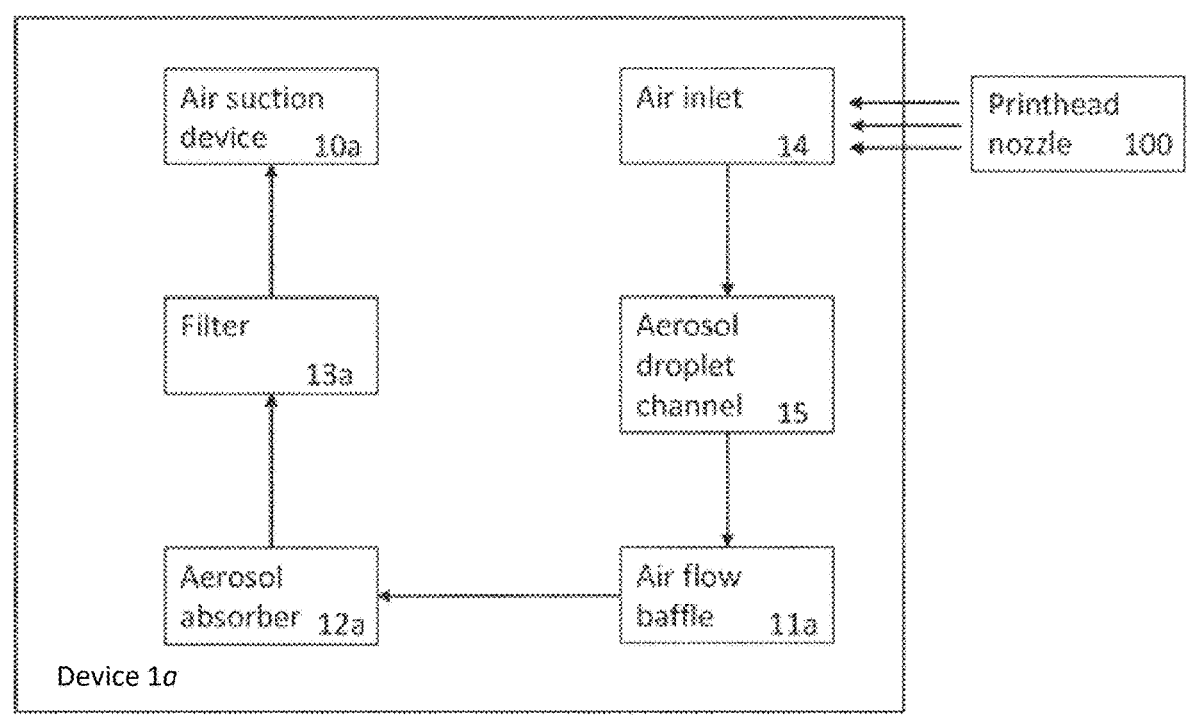

In some examples, as shown in FIG. 2, the device 1a may further comprise an air inlet 14 and/or an aerosol droplet channel 15. Device 1a, air suction device 10a, air flow baffle 11a, aerosol absorber 12a and air suction device 13a may correspond to the device 1, air suction device 10, air flow baffle 11, aerosol absorber 12 and air suction device 13 of FIG. 1.

In some examples, the device 1a may further comprise the air inlet 14. The air inlet 14 may be positioned substantially between the printhead nozzle 100 and the aerosol absorber 12a, based on the direction of air flow. Further, in some examples, the device 1a may comprise an aerosol droplet channel 15, extending between the air inlet 14 and the aerosol absorber 12a, to collect aerosol droplets deposited thereon and direct the aerosol droplets towards the aerosol absorber 12a. In some examples, the device 1a may comprise at least one aerosol droplet channel 15. Multiple aerosol droplet channels 15 may be used depending on the amount of aerosol droplets collected/volume of print material deposited on the aerosol droplet channels 15.

In some examples, the aerosol droplet channel 15 may be positioned such that the air flow, which may pass over or along the aerosol droplet channel 15, may encourage or push deposited aerosol droplets towards the aerosol absorber 12a.

In some examples, the air flow baffle 11a may include a film to inhibit adherence of aerosol droplets to the air flow baffle. For example, the film may be a polyester film, such as BoPET/Mylar.

FIG. 3a is a schematic of a device 1b in accordance with some examples. As shown, the device 1b may include an air suction device 10b, an air flow baffle 11b, an aerosol absorber 12b and a droplet filter 13b. In some examples, as shown in FIG. 3a, the device 1b may include multiple air flow baffles 11b. Multiple air flow baffles 11b may provide the benefit of removing more aerosol droplets before the air flow reaches the droplet filter 13b. The droplet filter 13b may be a more expensive component than the aerosol absorber 12b. Thus, increasing the amount of droplets which are deposited on the aerosol absorber 12b, and so do not reach the droplet filter 13b, increases the useful life of the droplet filter 13b, reducing running costs associated with maintenance of the printer and the device 1b.

In some examples, as shown in FIG. 3a, the device 1b may define a cavity in which the air suction device 10b, air flow baffle 11b, aerosol absorber 12b and droplet filter 13b are located. An air inlet 14b may allow air to enter the cavity. The air inlet 14b may be positioned near the printhead nozzle 100. For example, the air inlet 14b may be positioned in the space between the printhead and the print medium, adjacent to the printhead nozzle 100. The air inlet 14b may be placed close enough to the printhead nozzle 100 so that the suction of the air suction device 10b draws air and suspended print material droplets away from the area between the printhead nozzle 100 and a target location on the print medium, where the print material is intended to be deposited.

The air suction device 10b may be located at or near an outlet of the cavity. In some examples, the air flow baffles 11b may be made of sheet metal and may be positioned within the cavity so as to direct air flow towards the aerosol absorber 12b. Air flow directed at or towards the aerosol absorber 12b may abruptly change direction at a surface or edge of the aerosol absorber 12b such that larger aerosol droplets may continue, by virtue of their momentum and larger mass, towards, and contact, the aerosol absorber 12b.

Figure 3B:
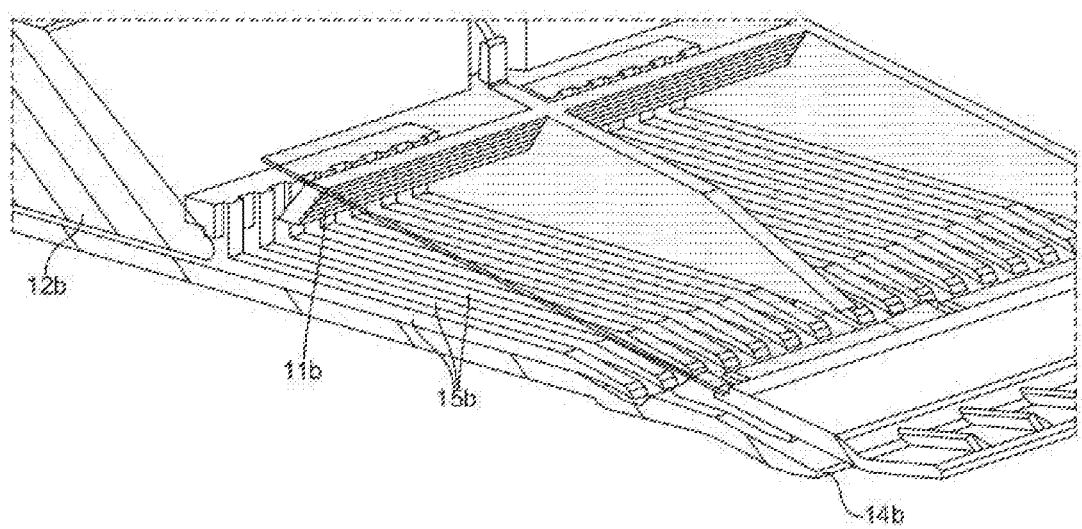

Between the air inlet 14b and the aerosol absorber 12b, as shown in FIGS. 3a and 3b, aerosol droplet channels 15b may be provided. The aerosol droplet channels 15b may partially or fully extend over the distance between the air inlet 14b and the aerosol absorber 12b. Aerosol droplet channels 15b may be used to move ink towards to the aerosol absorber 12b, for example by capillary action. In some examples, aerosol droplet channels 15b may extend from the aerosol absorber 12b up to a defined distance from the air inlet 14b. By maintaining a gap between the air inlet 14b and the aerosol droplet channels 15b, clogging of the air inlet 14b may be reduced or avoided entirely.

In some examples, the air flow baffles 11b may direct air flow towards the aerosol droplet channels 15b so that some aerosol droplets are deposited in the aerosol droplet channels 15b before the air flow passes the aerosol absorber 12b or the droplet filter 13b. Once past the aerosol absorber 12b, the air flow may continue to the droplet filter 13b. Droplet filter 13b may be a fine particle/droplet filter to remove the remaining aerosol droplets before the air reaches the air suction device 10b. Providing successive stages of aerosol removal/filtration before the air passes the air suction device 10b may reduce the amount of print material deposited on the air suction device 10b and thus improve the lifespan of the air suction device 10b.

Figure 4:
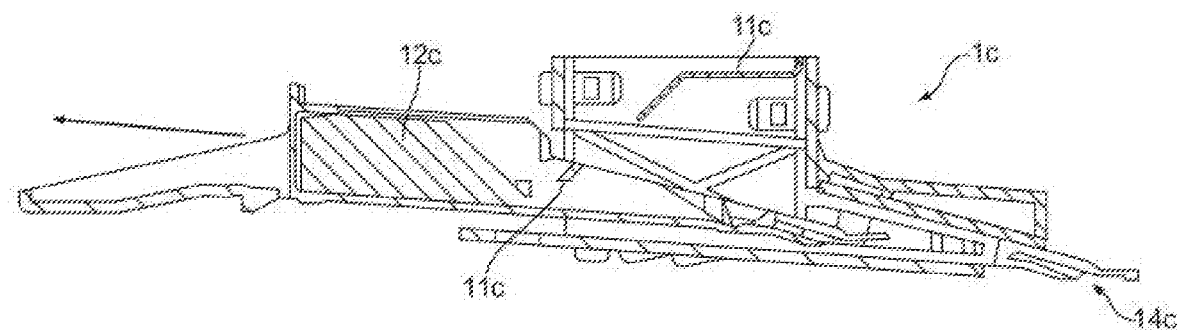

In some examples, as shown in FIG. 4, the aerosol absorber 12c may be removable from the device 1c. The aerosol absorber 12c may be expected to absorb a large amount of print material and so may need replacing regularly.

In some examples, the droplet filter 13 may be removable from the device 1. The droplet filter 13 may also need to be replaced regularly. Providing an easily removable droplet filter 13 allows for quick replacement of the droplet filter 13, leading to reduced downtime for the device 1 and, in turn, to improved print quality. The aerosol absorber 12 and/or the droplet filter 13 may be housed in a removeable drawer, which may further improve the speed at which the aerosol absorber 12 and/or the droplet filter 13 may be replaced. Each of the droplet filter 13 and aerosol absorber 12 may be independently removable to reduce downtime for maintenance of the device 1.

In some examples, the air suction device 10 may create an air flow speed past the printhead nozzle of approximately 1-3 m/s. Air flow speeds of approximately 1-3 m/s have been shown to sufficiently remove aerosols from around the printhead nozzle without affecting the path of print material travelling from the printhead nozzle to the print material as part of a print action.

In some examples, the air suction device 10 may create a region of reduced pressure between the air suction device 10 and the droplet filter 13. In some examples, the air suction device 10 may create a region of reduced pressure between the air suction device 10 and the air inlet 14. Creating a region of reduced pressure, or a partial vacuum, in the way described has been shown to improve laminarity (reduce turbulence) of the air flow past the printhead nozzle.

In some examples, described herein and as shown in FIG. 5, there is provided a method for removing aerosol droplets generated during a printing process. The method may comprise drawing air 5101, with aerosol droplets suspended therein, away from a printhead nozzle, towards an air flow turbulence inducer causing turbulence in air flow, such that at least some aerosol droplets contact an aerosol absorber, and through a filter for filtering aerosol droplets from the air.

In accordance with some examples, an air flow turbulence inducer may be any object or structure suitable for causing turbulent air flow.

In some examples, the air may be drawn at an air flow speed approximately 1-3 m/s, to create substantially laminar air flow around the printhead nozzle. This air flow may help to reduce a phenomenon called "aeroworms" from occurring in and around a print area. Laminar air flow around the printhead nozzle may further improve print quality by avoiding introducing turbulence in the print material streams.

In some examples, the air is drawn over an aerosol droplet groove, so that at least some aerosol droplets are deposited in the aerosol droplet groove.

Aerosol droplet grooves may be extend towards the aerosol absorber, for example by capillary action or by virtue of the air flow. In some examples, aerosol droplet grooves may extend for a predetermined distance from the aerosol absorber to allow aerosol droplets to be deposited therein/thereon.

In some examples, the air is drawn by creating a region of reduced pressure between an air suction device and the filter.

In some examples, described herein and as shown in FIG. 6, there is provided a further method for removing an aerosol generated during a printing process. The method may comprise positioning 5201 an obstacle and a filter between a printhead nozzle and an air suction device. The method may further comprise drawing 5202 air away from the printhead nozzle such that the air is directed towards the obstacle and through the filter before reaching the air suction device. The obstacle may change a direction of air flow such that at least some aerosol droplets are prevented from following the air flow path.

According to the examples, the positioning of the obstacle and filter may be based on the direction of air flow between the printhead nozzle and air suction device and not necessarily the geographic location of the printhead nozzle and air suction device. Once the air passes the obstacle, the air and remaining suspended droplets may continue towards the filter, such that the air passes through the filter and the remaining suspended droplets are retained in the filter.

While the method, apparatus and related aspects have been described with reference to certain examples, various modifications, changes, omissions, and substitutions may be made without departing from the scope of the present disclosure. It is intended, therefore, that the methods, devices and related aspects be limited only by the scope of the following claims and their equivalents. It should be noted that the above-mentioned examples illustrate rather than limit what is described herein, and that those skilled in the art will be able to design many alternative implementations without departing from the scope of the appended claims.

The word "comprising" does not exclude the presence of elements other than those listed in a claim, "a" or "an" does not exclude a plurality, and a single unit may fulfil the functions of several units recited in the claims.

The features of any dependent claim may be combined with the features of any of the independent claims or other dependent claims.

The invention claimed is:

1. A device comprising:
   an air suction device;
   an air flow baffle;
   an aerosol absorber;
   a droplet filter;
   an air inlet, positioned, along the air flow direction, between a printhead nozzle and the aerosol absorber; and
   an aerosol droplet channel, extending between the air inlet and the aerosol absorber, to collect aerosol droplets deposited thereon and direct the aerosol droplets towards the aerosol absorber; wherein the air suction device is to draw air away from an area around the printhead nozzle, past the air flow baffle, through the droplet filter, towards the air suction device, and the air flow baffle is to cause a change in air flow direction such that at least some aerosol droplets contact the aerosol absorber.

2. The device of claim 1, wherein the aerosol absorber is removable from the device.

3. The device of claim 1, wherein the droplet filter is removable from the device.

4. The device of claim 1, wherein the air suction device is to create an air flow speed past the printhead nozzle of approximately 1-3 m/s.

5. The device of claim 1, wherein the air suction device is to create a region of reduced pressure between the air suction device and the droplet filter.

6. The device of claim 1, wherein the air flow baffle includes a film to inhibit adherence of aerosol droplets to the air flow baffle.

7. A method for removing an aerosol generated during a printing process, the method comprising:
   drawing air, with aerosol droplets suspended therein, away from a printhead nozzle, towards an air flow turbulence inducer causing a change in air flow direction and turbulence in air flow, such that at least some aerosol droplets contact an aerosol absorber, and through a filter for filtering aerosol droplets from the air.

8. The method of claim 7, wherein the air is drawn at an air flow speed approximately 1-3 m/s, to create substantially laminar air flow around the printhead nozzle.

9. The method of claim 7, wherein the air is drawn over an aerosol droplet groove, so that at least some aerosol droplets are deposited in the aerosol droplet groove.

10. The method of claim 7, wherein the air is drawn by creating a region of reduced pressure between an air suction device and the filter.

11. A method for removing an aerosol generated during a printing process, the method comprising:
    positioning an obstacle, an aerosol absorber, and a filter between a printhead nozzle and an air suction device; and
    drawing air away from the printhead nozzle such that the air is directed towards the obstacle, past the aerosol absorber, and through the filter before reaching the air suction device, wherein the obstacle changes a direction of air flow such that at least some aerosol droplets are prevented from following the air flow path.

12. The method of claim 11, wherein the air is drawn away from the printhead nozzle in a substantially laminar air flow.

13. The method of claim 11, wherein the air is drawn by creating a region of reduced pressure between the air suction device and the filter.

\* \* \* \* \*